US 12,248,895 B2

(12) United States Patent
Tripathy et al.

(10) Patent No.: US 12,248,895 B2
(45) Date of Patent: Mar. 11, 2025

(54) METHODS AND APPARATUSES FOR ADDING SUPPLEMENTAL ORDER DELIVERIES TO DELIVERY PLANS

(71) Applicant: Walmart Apollo, LLC, Bentonville, AR (US)

(72) Inventors: Chittaranjan Tripathy, Sunnyvale, CA (US); Abhijeet Rajendra Phatak, Sunnyvale, CA (US); Ioannis Pavlidis, Boulder, CO (US); Karan Khurana, Foster City, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 252 days.

(21) Appl. No.: 17/492,237

(22) Filed: Oct. 1, 2021

(65) Prior Publication Data

US 2022/0245545 A1 Aug. 4, 2022

Related U.S. Application Data

(60) Provisional application No. 63/143,152, filed on Jan. 29, 2021.

(51) Int. Cl.
*G06Q 10/0631* (2023.01)
*G06N 20/00* (2019.01)
(Continued)

(52) U.S. Cl.
CPC ....... *G06Q 10/06312* (2013.01); *G06N 20/00* (2019.01); *G06Q 10/08355* (2013.01); *G06Q 10/0838* (2013.01)

(58) Field of Classification Search
CPC ......... G06Q 10/06312; G06Q 10/0838; G06Q 10/08355; G06N 20/00
See application file for complete search history.

(56) References Cited

U.S. PATENT DOCUMENTS 10,783,462 B1 9/2020 Mo et al.
10,990,911 B2 * 4/2021 Tanno ................. G06Q 10/047
(Continued)

OTHER PUBLICATIONS

Guru, "Introducing DoubleDash, a new way to shop multiple stores in one order", DoorDash, Aug. 2021, 5 pages.
(Continued)

*Primary Examiner* — Dylan C White
(74) *Attorney, Agent, or Firm* — Morgan, Lewis & Bockius LLP; Manita Rawat

(57) ABSTRACT

A delivery route planning system can include a computing device configured to obtain order delivery data that includes information characterizing delivery locations and delivery time windows associated with a first plurality of orders and to determine a delivery plan based on the order delivery data. The computing device can be further configured to identify recyclable time in the delivery time and to obtain supplemental order delivery data that includes information characterizing supplemental orders characterizing delivery locations and delivery time windows associated a second plurality of orders. The computing system can add one or more supplemental order deliveries from the second plurality of orders to the delivery plan based on the recyclable time, the supplemental order delivery data and at least one predetermined delivery constraint.

11 Claims, 8 Drawing Sheets

(51) Int. Cl.
    *G06Q 10/083*     (2024.01)
    *G06Q 10/0835*     (2023.01)

(56) References Cited

U.S. PATENT DOCUMENTS

| | | |
|---|---|---|
| 11,397,911 B2 * | 7/2022 | Silverman ........ G06Q 10/06315 |
| 11,574,277 B2 * | 2/2023 | Steves .................. G05D 1/0212 |
| 11,797,915 B2 * | 10/2023 | Silverman ........ G06Q 10/08355 |
| 2007/0195778 A1 | 8/2007 | Tatar et al. |
| 2015/0081360 A1 * | 3/2015 | Sun .................. G06Q 10/06311 |
| | | 705/7.13 |
| 2016/0148303 A1 * | 5/2016 | Carr .................. G06Q 30/0635 |
| | | 705/26.81 |
| 2018/0096287 A1 * | 4/2018 | Senger .................. G06Q 10/08 |
| 2018/0121876 A1 * | 5/2018 | Doherty ............... G08G 5/0069 |
| 2018/0315319 A1 * | 11/2018 | Spector .................. G08G 1/202 |
| 2019/0197475 A1 * | 6/2019 | Bianconcini ..... G06Q 10/08355 |
| 2019/0220785 A1 * | 7/2019 | Tanno .................. G06Q 10/083 |
| 2019/0266557 A1 * | 8/2019 | Berk ...................... G06Q 50/12 |
| 2020/0116508 A1 * | 4/2020 | Dashti .............. G06Q 10/08355 |
| 2020/0117683 A1 * | 4/2020 | Ji ............................ G06F 16/29 |
| 2020/0265383 A1 * | 8/2020 | Zhang ............. G06Q 10/08355 |
| 2021/0133677 A1 * | 5/2021 | Fu ........................... G06F 16/29 |
| 2022/0351131 A1 * | 11/2022 | Silverman ........ G06Q 10/08355 |
| 2024/0070609 A1 * | 2/2024 | Petrielli ............. G06Q 10/0833 |

OTHER PUBLICATIONS

Savuran, et al., "Route Optimization Method for Unmanned Air Vehicle Launched from a Carrier", Lecture Notes on Software Engineering, Nov. 2015, 3(4): 279-284.

Moran, "Walmart boosting grocery withapp changes, new partnership", Grocery Dive, Sep. 2021, 4 pages.

* cited by examiner

METHODS AND APPARATUSES FOR ADDING SUPPLEMENTAL ORDER DELIVERIES TO DELIVERY PLANS

CROSS-REFERENCE TO RELATED APPLICATIONS

This application claims the benefit of U.S. Provisional Application No. 63/143,152 filed on Jan. 29, 2021. The entire disclosure of the above application is incorporated herein by reference in its entirety.

TECHNICAL FIELD

The disclosure relates generally to automatically adding supplemental order deliveries to delivery plans.

BACKGROUND

At least some ecommerce marketplaces can include delivery services that allow a customer to select a delivery time window for the delivery of products or services that can be purchased on the ecommerce marketplace. In some examples, the ecommerce marketplace is implemented by a retailer website. The retailer website can allow a customer to search, browse and select products for purchase. After a customer selects products for purchase, the retailer website can allow the customer to choose one or more delivery time windows during which time the ordered products (or services) can be delivered to the customer's delivery destination.

The ability of a retailer or other delivery provider to plan and execute the delivery of a customer's order during the requested time window is a complex task that can be difficult due to many factors including conflicting time windows, delivery van constraints, route planning, volume management and the like. The complex task of deploying delivery resources (manpower, delivery fleet, etc.) often results in under-utilization and other inefficiencies. There exists a need, therefore, for improved delivery route planning and improved deployment of delivery resources. Such improvements can result in lower costs per delivery, less miles driven, increased revenues, improved customer satisfaction among other improvements for the retailer.

SUMMARY

The embodiments described herein are directed to a delivery route planning system and related methods. The delivery route planning system can be implemented using one or more computing devices that can include operative elements that can determine a delivery plan in order to deliver ordered goods during a customer's desired delivery window. After or in connection with determining this delivery plan, the delivery route planning system can determine if recyclable time exists in the delivery plan. The recyclable time can be, for example, extra time between deliveries that presents an opportunity for other goods to be delivered or services to be offered. The delivery route planning system can insert extra or supplemental order deliveries in the delivery plan without negatively impacting the ability of the delivery fleet to deliver goods during the customer's desired delivery windows. In this manner, the efficiency of the delivery fleet can be increased. Such increased efficiencies can lead to improved customer satisfaction, reduced cost, increased revenues, improved profitability and other improvements.

In accordance with various embodiments, exemplary systems may be implemented in any suitable hardware or hardware and software, such as in any suitable computing device. For example, in some embodiments, a computing device is configured to obtain order delivery data that includes information characterizing delivery locations and delivery time windows associated with a first plurality of orders and to determine a delivery plan based on the order delivery data. The computing device can be further configured to identify recyclable time in the delivery plan and to obtain supplemental order delivery data that includes information characterizing supplemental orders characterizing delivery locations and delivery time windows associated a second plurality of orders. The computing system can add one or more supplemental order deliveries from the second plurality of orders to the delivery plan based on the recyclable time, the supplemental order delivery data and at least one predetermined delivery constraint.

In one aspect, the computing device may be configured to predict a density of the delivery plan prior to the order delivery data being finalized by a customer.

In another aspect, the computing device may be configured to add one or more supplemental order deliveries to the delivery based on the predicted density of the delivery plan.

In another aspect, the computing device may be configured to obtain historical order information for a customer associated with at least one of the first plurality of orders and to predict a density of delivery plan based on the historical order information.

In another aspect, the computing device may be configured to predict a density of the delivery plan using a trained machine learning model.

In another aspect, the first plurality of orders may each comprise a grocery order for grocery items and the second plurality of orders may each comprise an order for general merchandise items.

In another aspect, the computing device may be configured to determine whether supplemental items associated with the supplemental order deliveries are available at a store from which the delivery plan originates and to send a request for the supplemental items when the supplemental items are not available at the store from which the delivery plan originates.

In some embodiments, a method is provided that includes obtaining order delivery data that includes information characterizing delivery locations and delivery time windows associated with a first plurality of orders and determining a delivery plan based on the order delivery data. The method can also include identifying recyclable time in the delivery plan and obtaining supplemental order delivery data that includes information characterizing supplemental orders characterizing delivery locations and delivery time windows associated a second plurality of orders. The method can also include adding one or more supplemental order deliveries from the second plurality of orders to the delivery plan based on the recyclable time, the supplemental order delivery data and at least one predetermined delivery constraint.

In yet other embodiments, a non-transitory computer readable medium has instructions stored thereon, where the instructions, when executed by at least one processor, cause a computing device to perform operations that include obtaining order delivery data that includes information characterizing delivery locations and delivery time windows associated with a first plurality of orders and determining a delivery route based on the order delivery data. The non-transitory computer readable medium can include further instructions that, when executed by the at least one processor, cause the computing device to perform operations including identifying recyclable time in the delivery plan and obtaining supplemental order delivery data that includes information characterizing supplemental orders characterizing delivery locations and delivery time windows associated a second plurality of orders. The operations can also include adding one or more supplemental order deliveries from the second plurality of orders to the delivery plan based on the recyclable time, the supplemental order delivery data and at least one predetermined delivery constraint.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein.

DETAILED DESCRIPTION

Figure 1:
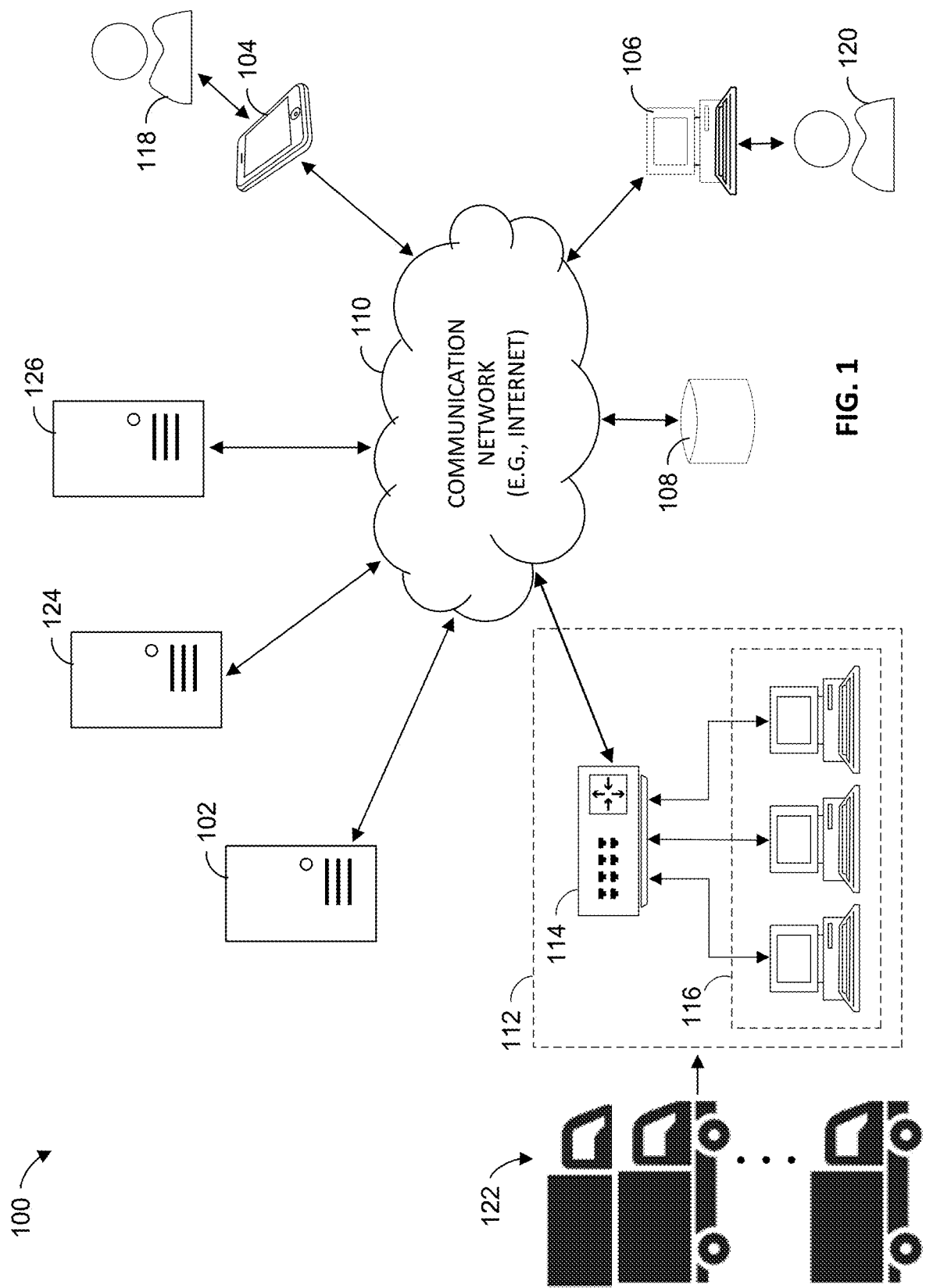
FIG. 1 is a block diagram of a delivery route planning system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "connected," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

In some electronic marketplaces, customers can order goods or services and then select a time window in which the goods are delivered or the services are provided at the customer's preferred location. One type of electronic marketplace that can offer this type of service is an online grocery retailer. It should be appreciated, however, that the teachings and principles of the present disclosure can also be applied to other types of electronic marketplaces. Such other types of electronic marketplaces can include other types of online retailers that may offer delivery of ordered goods. In yet other electronic marketplaces, service providers (e.g., maintenance, repair, and installation services providers) may allow ordering or selection of services in an electronic or online environment.

In the example implementation of an online grocery retailer, the retailer may host or offer an electronic marketplace such as a website. The retailer's website can permit a customer to browse, search and select products to be delivered to the customer's home or other delivery destination. The customer may be permitted to select a time window during which time the customer desires the ordered products to be delivered. For example, the retailer may allow the customer to choose one of several two-hour windows for the delivery of ordered products during a selected day. In other examples, the time windows can have other durations such as thirty minutes, one hour, three hours, four hours or other suitable time window durations.

Prior to the selected time window, the retailer can open a particular date for deliveries. When the retailer opens a particular date, the date is available for a customer to schedule a delivery. When a date is made available to customers, the customer can schedule the delivery and then add products, delete products or modify the products in the customer's virtual cart. Many of these websites allow the customer to continue to add, delete or modify the products in the customer's virtual cart until a cut-off time at which the customer's order is finalized for delivery. The retailer may set the cut-off time at any suitable time period prior to the scheduled delivery time. In some examples, the retailer may set the cut-off time at midnight the day before the scheduled delivery. In other examples, the retailer may set the cut-off time at six hours before the scheduled delivery. In still other examples, the retailer may set the cut-off time at other time periods before the scheduled delivery such as thirty minutes, one hour, four hours, twelve hours, eighteen hours, one day or the like.

After the cut-off time has passed, the retailer can use a suitable methodology to automatically prepare a delivery plan that can allocate the customers' orders for a particular delivery time into an optimized delivery route for each vehicle used to transport the products in the order from the retailer's location (e.g., store, warehouse, logistic center, factory, etc.) to the customer's designated delivery location (e.g., home, business, warehouse, office, storage facility, etc.). The retailer also can allocate each customer order to a delivery vehicle in a retailer's fleet of delivery vehicles.

The allocation of the customers' orders into the delivery fleet can be made to minimize the resources required to deliver the products in the customers' orders. For example, the allocation can minimize the amount of miles that are driven by the delivery fleet or the allocation can minimize the amount of fuel expended to deliver the products. In still other examples, the allocation can minimize the amount of time that it takes to deliver the products. In yet other examples, the allocation can minimize the cost to the retailer in delivering the products in the customers' orders. Such a minimization of cost can account for various measures, including two or more of the measures described above. As can be appreciated, it can be advantageous to minimize the cost to the retailer by minimizing the amount of fuel, the amount of miles driven, the amount of man-hours expended or various other measures to increase the profitability of the retailer.

Any suitable methodology can be used to allocate the customer orders to the retailer's delivery fleet. Various automated methodologies or algorithms can be used to optimize the allocation of orders and to create an optimized routing for the deliveries of the customers' orders. This type of automated optimization is an instance of Capacitated Vehicle Routing Problem with Time Windows (CVRPTW) for which various mathematical models are available or have been previously created. One of the inputs for such models, algorithms or solvers is the size of the customer's order in terms of weight, volume and storability-type of product (i.e., chilled, frozen, ambient). The volume of the products in the customer order can be measured by defining the number of totes that are required for the delivery. A tote can be a predetermined container that is used to hold and move the products in a customer order from the retailer's location to the delivery location. For example, a tote can be a box, bag, or other suitable storage container. The tote's can be, for example loaded with goods from a customer's order and then placed into the vehicles of the retailer's vehicle fleet for delivery to customers. In other examples, the products in the customer order can be defined using other measurements such as, weight, volume or tote count or some combination thereof.

As can be appreciated, when the delivery routes and the allocation of the customer orders has been completed, there may be time periods between deliveries of goods to customers that is available for the delivery of supplemental goods. These time periods or "recyclable time" can be re-allocated for the delivery of supplemental goods by the delivery fleet. Instead of the delivery fleet being idle during this recyclable time, the recyclable time can be used for productive actions such as the delivery of supplemental goods.

The delivery route planning systems of the present disclosure can identify if other orders for goods may be awaiting delivery in locations near to the delivery locations in the delivery plan. When such existing other orders are awaiting delivery, these order can be added as supplemental orders for delivery by the delivery fleets as part of the delivery plan. In one example, the previously described examples can be applied in the context of a grocery retailer that may also sell and delivery other general purpose merchandise that is often delivered through conventional delivery methods such as courier services and the like. Instead of delivering the general purpose merchandise through the traditional delivery services (e.g., in-house, contracted, or independent delivery services), the general purpose merchandise can be added to a grocery delivery route and delivered during execution of the grocery delivery plan. While the present disclosure describes an example implementation of the teachings and principles of the present disclosure in the context of a grocery retailer, it should be appreciated that such teachings and principles can be applied in other contexts and industries in which an existing delivery or service route may be existing. Examples of such other contexts and industries includes repair or maintenance service providers, specialty good providers (dairy, frozen food or other delivery services) and the like.

Existing or traditional methods and apparatuses of delivering goods suffer from a variety of drawbacks. Such existing methods and apparatuses are often inefficient and result in wasted time and manpower in order to deliver goods to customers during the customers' desired delivery times. The under-utilization of the delivery fleet can, in turn, lead to increased costs, lower revenue and reduced customer satisfaction. Furthermore, retailers or other operators of marketplaces can often need multiple different delivery services to deliver its goods to the same geographic locations. This duplication of effort, in turn, leads to further inefficiencies and increased costs.

The methods and apparatuses of the present disclosure are improvements over traditional delivery systems. The methods and apparatuses enable the retailer to better utilize its existing delivery services and in a more efficient manner. In addition, customers can obtain goods more quickly than traditional delivery services because many retailers have multiple daily delivery routes that are delivering grocery items to customers. Such daily (or hourly, in some instances) delivery routes provide the opportunity for customers to receive general merchandise in an expedient manner. This can lead to increased revenue and improved customer satisfaction.

Turning to the drawings, FIG. 1 illustrates a block diagram of a delivery route planning system 100 that includes a densifier 102 (e.g., a server, such as an application server), a central ordering computing device 124, an external information source 126 (e.g., a web server), a retailer order management system 112, a database 108, and multiple customer computing devices 104, 106 operatively coupled over network 110. Densifier 102, central ordering computing device 124, external information source 126, retailer order management system 112, and multiple customer computing devices 104, 106 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 110.

In some examples, densifier 102 can be a computer, a workstation, a laptop, a server such as a cloud-based server, or any other suitable device. In some examples, each of multiple customer computing devices 104, 106 can be a cellular phone, a smart phone, a tablet, a personal assistant device, a voice assistant device, a digital assistant, a laptop, a computer, or any other suitable device. In some examples, densifier 102 is operated by a retailer, and multiple customer computing devices 104, 106 are operated by customers of the retailer.

The retailer order management system 112 can include one or more workstations 116 that can be coupled to a server, communication network or router 114. The retailer order management system 112 can, for example, be located at a store, warehouse or other retailer location. The store or warehouse can be operated by the retailer and can be a location at which customer order information is received from the central ordering computing device 124. The customer order information can include, for example, the final order information for customers' orders. The final order information can include the products, quantities and delivery information for the customers' orders. This information can be conveyed and used to deliver the customer orders using one or more vehicles 122 in the retailer's delivery fleet.

Densifier 102 can also be operable to communicate with database 108 over the communication network 110. The database 108 can be a remote storage device, such as a cloud-based server, a memory device on another application server, a networked computer, or any other suitable remote storage. Although shown remote to densifier 102, in some examples, database 108 can be a local storage device, such as a hard drive, a non-volatile memory, or a USB stick.

Communication network 110 can be a WiFi network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 110 can provide access to, for example, the Internet.

The customer computing devices 104, 106 may communicate with the central ordering computing device 124 over communication network 110. For example, the central ordering computing device 124 may host one or more websites. Each of the customer computing devices 104, 106 may be operable to view, access and interact with the websites hosted by the central ordering computing device 124. In some examples, the central ordering computing device 124 can allow a customer 118, 120, via the customer computing devices 104, 106, to browse, search and/or select products for purchase. The products can include grocery products that can be traditionally delivered by the retailer's delivery fleet as well as general purchase merchandise that can be added to the delivery route for delivery by the retailer's delivery fleet. The central ordering computing device 124 can also allow the customer to select a delivery window for the delivery of the ordered items. The central ordering computing device 124 may also permit the customer to add, delete or revise the ordered items at a time period prior to a cut-off time before the selected delivery window.

Figure 2:
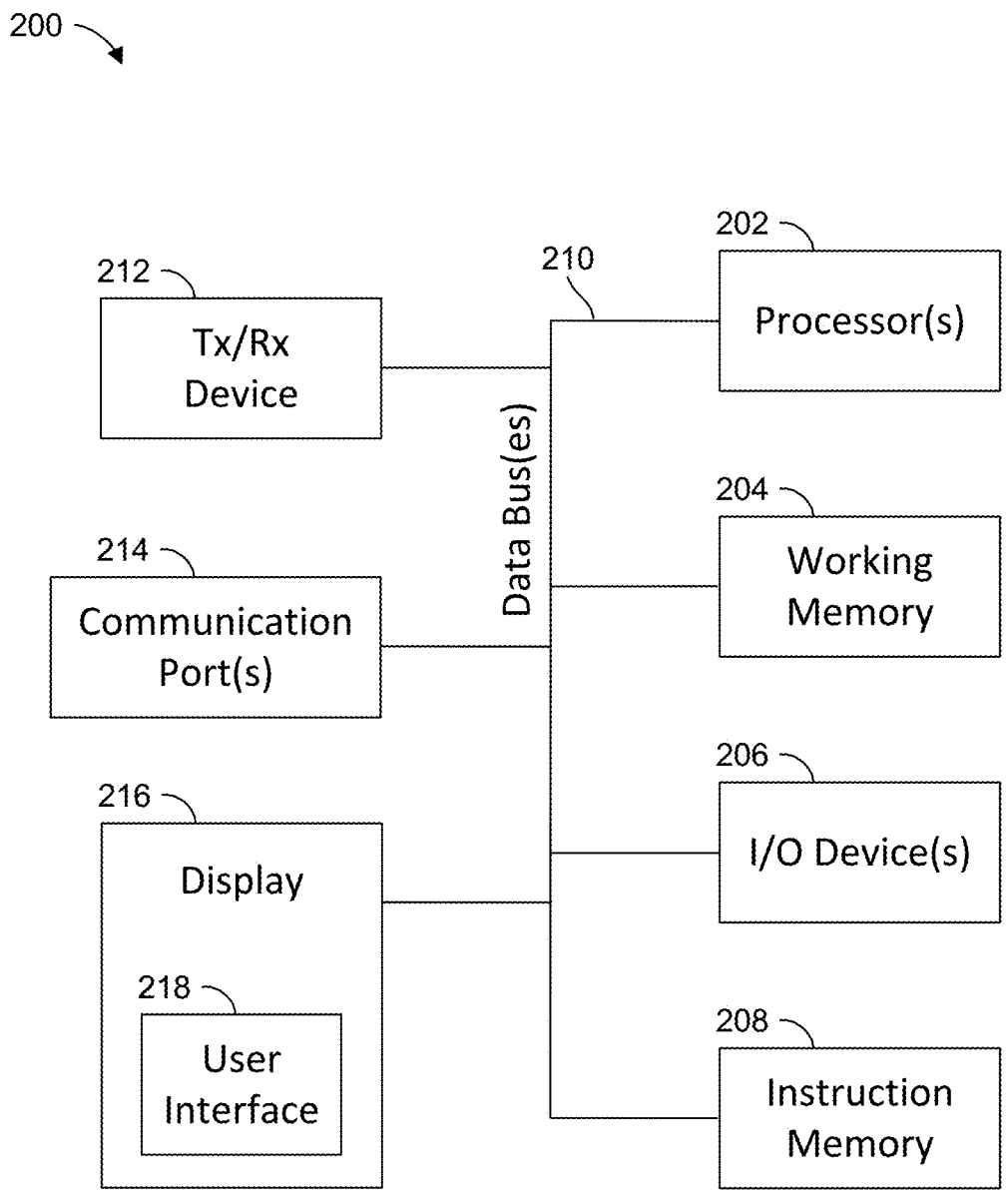
FIG. 2 is a block diagram of an order densifier of the delivery route planning system of FIG. 1 in accordance with some embodiments.

FIG. 2 illustrates an example computing device 200. The densifier 102, the retailer order management system 112, the central ordering computing device 124, the external information source 126, and/or the customer computing devices 104, 106 may include the features shown in FIG. 2. For the sake of brevity, FIG. 2 is described relative to the densifier 102. It should be appreciated, however, that the elements described can be included, as applicable, in the retailer order management system 112, the central ordering computing device 124, the external information source 126, and/or the customer computing devices 104, 106.

As shown, the densifier 102 can be a computing device 200 that may include one or more processors 202, working memory 204, one or more input/output devices 206, instruction memory 208, a transceiver 212, one or more communication ports 214, and a display 216, all operatively coupled to one or more data buses 210. Data buses 210 allow for communication among the various devices. Data buses 210 can include wired, or wireless, communication channels.

Processors 202 can include one or more distinct processors, each having one or more cores. Each of the distinct processors can have the same or different structure. Processors 202 can include one or more central processing units (CPUs), one or more graphics processing units (GPUs), application specific integrated circuits (ASICs), digital signal processors (DSPs), and the like.

Processors 202 can be configured to perform a certain function or operation by executing code, stored on instruction memory 208, embodying the function or operation. For example, processors 202 can be configured to perform one or more of any function, method, or operation disclosed herein.

Instruction memory 208 can store instructions that can be accessed (e.g., read) and executed by processors 202. For example, instruction memory 208 can be a non-transitory, computer-readable storage medium such as a read-only memory (ROM), an electrically erasable programmable read-only memory (EEPROM), flash memory, a removable disk, CD-ROM, any non-volatile memory, or any other suitable memory.

Processors 202 can store data to, and read data from, working memory 204. For example, processors 202 can store a working set of instructions to working memory 204, such as instructions loaded from instruction memory 208. Processors 202 can also use working memory 204 to store dynamic data created during the operation of the densifier 102. Working memory 204 can be a random access memory (RAM) such as a static random access memory (SRAM) or dynamic random access memory (DRAM), or any other suitable memory.

Input-output devices 206 can include any suitable device that allows for data input or output. For example, input-output devices 206 can include one or more of a keyboard, a touchpad, a mouse, a stylus, a touchscreen, a physical button, a speaker, a microphone, or any other suitable input or output device.

Communication port(s) 214 can include, for example, a serial port such as a universal asynchronous receiver/transmitter (UART) connection, a Universal Serial Bus (USB) connection, or any other suitable communication port or connection. In some examples, communication port(s) 214 allows for the programming of executable instructions in instruction memory 208. In some examples, communication port(s) 214 allow for the transfer (e.g., uploading or downloading) of data, such as order delivery data and supplemental order delivery data.

Display 216 can display a user interface 218. User interfaces 218 can enable user interaction with the densifier 102. For example, user interface 218 can be a user interface that allows an operator to interact, communicate, control and/or modify different features or parameters of the densifier 102. The user interface 218 can, for example, display the delivery route or the performance of the densifier 102 using different textual, graphical or other types of graphs, tables or the like. In some examples, a user can interact with user interface 218 by engaging input-output devices 206. In some examples, display 216 can be a touchscreen, where user interface 218 is displayed on the touchscreen.

Transceiver 212 allows for communication with a network, such as the communication network 110 of FIG. 1. For example, if communication network 110 of FIG. 1 is a cellular network, transceiver 212 is configured to allow communications with the cellular network. In some examples, transceiver 212 is selected based on the type of communication network 110 densifier 102 will be operating in. Processor(s) 202 is operable to receive data from, or send data to, a network, such as communication network 110 of FIG. 1, via transceiver 212.

Figure 3:
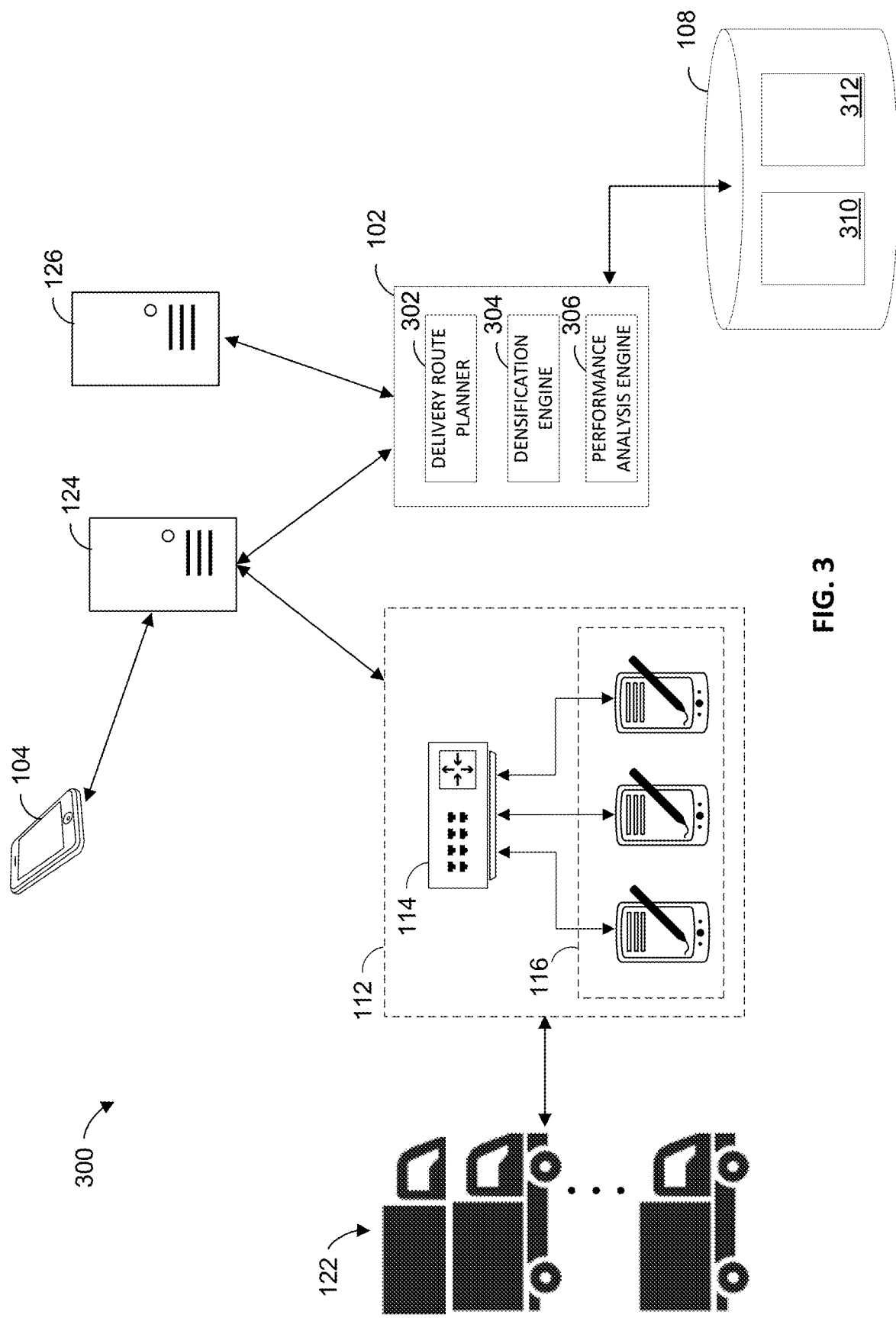
FIG. 3 is a block diagram illustrating examples of various portions of the delivery route planning system of FIG. 1 in accordance with some embodiments.

Turning now to FIG. 3, further aspects of the delivery route planning system 300 are shown. In this example 300, the elements described below are shown in communication with each other. It should be appreciated, however, that while not shown, the elements in example 300 can be in communication with each other over a communication network (e.g., communication network 110).

As shown, the densifier 102 can be coupled to the central ordering computing device 124, the external information source 126, the retailer order management system 112 and the database 108. The densifier 102 can operate to receive information and to send information to these elements as will be hereinafter described. The densifier 102 can operate to add supplemental order deliveries to a delivery route or delivery plan. In one example, the densifier 102 can obtain order delivery data that can include information about a customer's grocery order. The grocery order can include, for example, information regarding the goods to be delivered, a location for the delivery and a delivery time window for multiple grocery orders. The densifier 102 can obtain the order delivery data from the central ordering computing device 124. The central ordering computing device 124 can collect and process customers' orders that are received from the customers via the customer computing device 104, for example.

The densifier 102 can include and/or invoke a delivery route planner 302. The delivery route planner 302 can operate to optimize a delivery route plan for the multiple grocery orders using the order delivery data. The delivery route planner 302 can use any suitable methodology for determining the delivery route plan. For example, the delivery route planner can include a delivery model that determines the delivery route plan by using algorithms to solve a NP-Hard Vehicle Routing Problem with Time Windows (VRPTW). The problem to be solved by the delivery route planner can be a complex problem due to time-window constraints, van capacity constraints, van-weight constraints, delivery driver break constraints, speed limit constraints and other constraints. This problem can be a constrained/capacitated VRPTW problem. Existing methods of delivery do not include subsequent steps to densify the solutions that may be provided using known methodologies. In this example, the densifier 102 can also include a densification engine 304. The densification engine 304 can perform subsequent operations to further optimize and improve the operating performance of the retailer by supplementing the initial delivery route plan containing a sequence of time-windowed order deliveries (e.g., grocery orders) with supplemental order deliveries (e.g., general merchandise orders).

As will be further explained below, the delivery route planner 302 and/or the densification engine 304 can obtain various types of information for various sources to perform the functions described herein. For example, the delivery route planner 302 and/or the densification engine 304 of the densifier 102 can obtain order delivery data 310. The order delivery data 310 can include information characterizing delivery locations and delivery time windows associated with customer orders. The order delivery data 310 can be stored in database 108 as shown. In other examples, the order delivery data 310 can also be obtained from the central ordering computing device 124 and/or the retailer order management system 112. The delivery route planner 302 and/or densification engine 304 can also obtain supplemental order delivery data 312. The supplemental order delivery data 312 can include information that characterizes supplemental order delivery locations and delivery times. The supplemental order delivery data 312 can be stored in the database 108 as shown. In other examples, the supplemental order delivery data 312 can be obtained by the densifier 102 from the central ordering computing device 124 and/or the retailer order management system 112. In the examples described, the order delivery data 310 can characterize grocery orders and the supplemental order delivery data 312 can characterize general merchandise orders.

The densifier 102 can also include a performance analysis engine 306. The performance analysis engine 306 can determine one or more performance metrics associated with delivery routes. The performance analysis engine 306 can determine, for example, metrics such as cost per delivery, number of deliveries per route, number of deliveries per stop, cost per delivery route and the like. These performance metrics and others can be used to assess the performance of the densifier 102. As can be appreciated, different techniques or different methodologies for the densification of a delivery route can be tested, implemented and compared to optimize the performance of the retailer and reduce costs.

As further shown in FIG. 3, the densifier 102 can be connected to the retailer order management system 112. In this example, the densified delivery route plans that can be determined by the densifier 102 can be sent to the retailer order management system 112. The delivery route plans can be communicated by a router 114 to one or more workstations or delivery associate computing devices 116. The delivery associate computing devices 116 can then be used by the delivery associates that may perform the deliveries of the customer orders in the densified delivery route plans using the delivery fleet 122.

Figure 4:
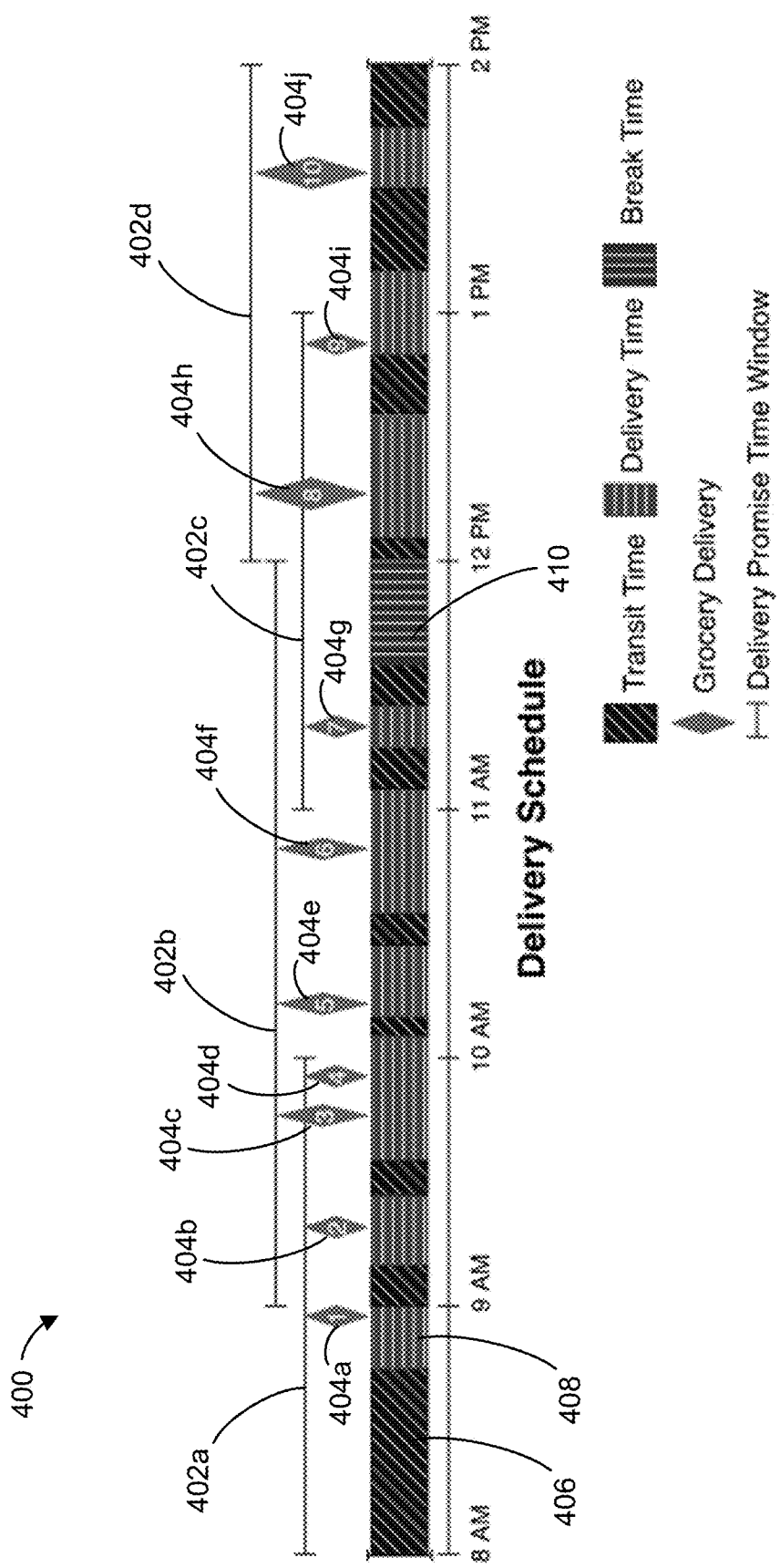
FIG. 4 is an illustration of an example delivery schedule of a delivery plan in accordance with some embodiments.

As shown in FIG. 4, the delivery route planner 302 can determine an initial delivery route plan 400. The initial delivery route plan 400 can include multiple delivery time windows 402a, 402b, 402c, 402d. In the example shown, the delivery route plan 400 includes four delivery time windows. In other examples, the delivery route plan 400 can include other quantities of delivery time windows such as more or less than four delivery time windows. The delivery route plan 400 can include different components that occupy the time during which the delivery route plan 400 is executed. In the example shown, the delivery route plan 400 includes transit time 406. Transit time 406 can be the time during which a delivery associate is driving or otherwise traveling to a delivery location. The delivery route plan 400 can also include delivery time 408. The delivery time 408 can be the time during which the delivery associate is moving ordered goods from the delivery vehicle 122 to a delivery location. For example, the delivery associate can be unloading a customer's order from the delivery vehicle 122 and leaving the ordered goods at a customer's residence. The delivery route plan 400 can also include break time 410. The break time 410 can be time provided for the delivery associate to take a break during his or her shift of operation.

The initial delivery route plan 400 can present opportunities for the delivery of additional goods during the delivery route. The additional time that can be available for the performance of additional deliveries can be called recyclable time. For example, when a delivery associate arrives at a delivery location to make a grocery delivery per the initial delivery route, the delivery associate does not need to leave the first delivery location until the next transit time that is allocated for the travel time to the next delivery location. The delivery time 408 may include, therefore, extra time or recyclable time that is available for the other activities. The densification engine 304 can identify the recyclable time in the initial delivery route plan 400. The densification engine 304 can then determine if there are other orders for goods that may have a delivery location located near to the delivery location of the first grocery delivery 404a. If the densification engine 304 determines the existence of orders for goods near the grocery delivery 404a, the densification engine 304 can add these supplemental deliveries 502 (FIG. 5) to the initial delivery route plan 400 to provide a densified delivery route plan 500.

Figure 5:
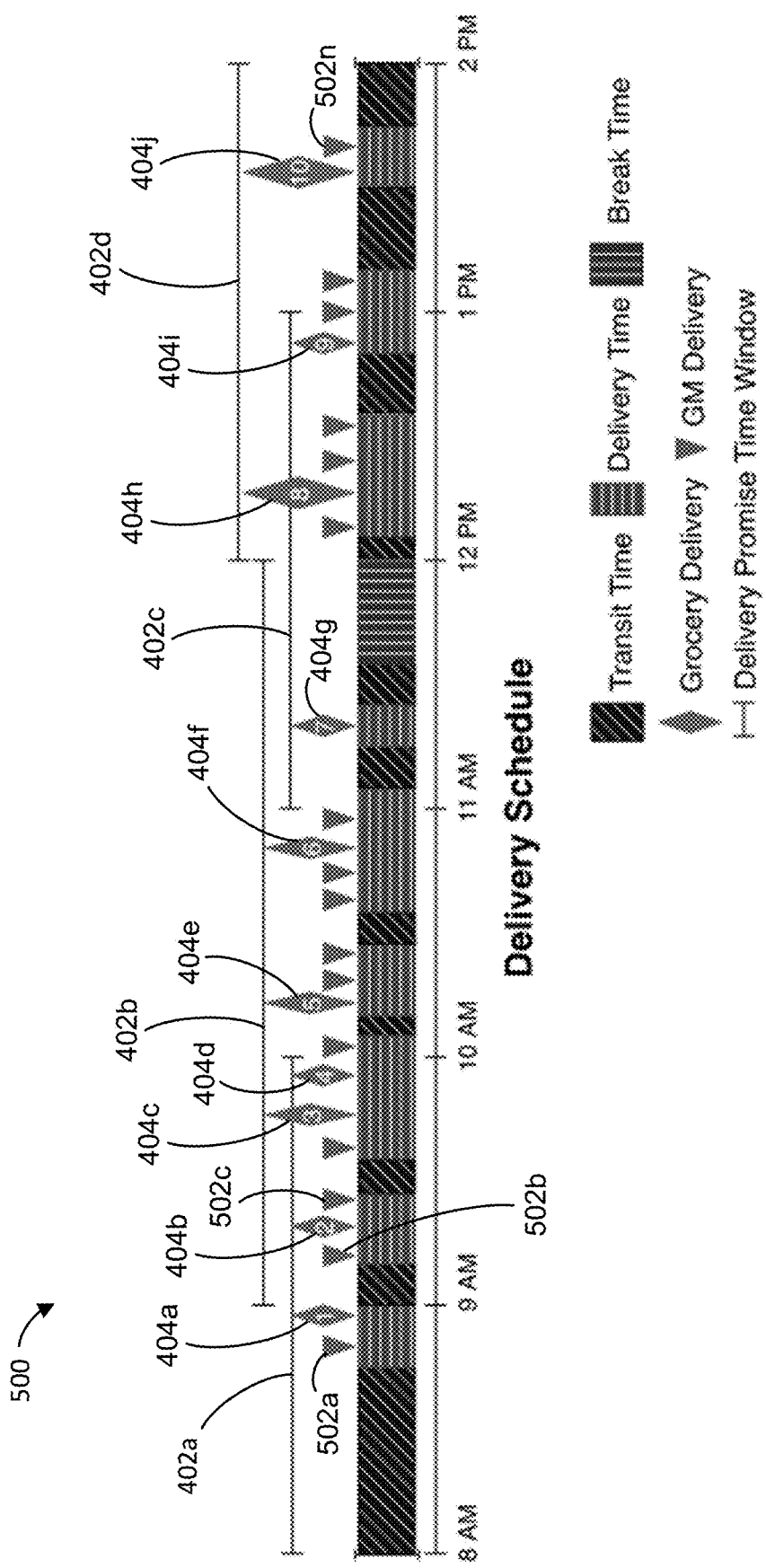
FIG. 5 is an illustration of the delivery schedule of FIG. 4 showing the addition of supplemental order deliveries in accordance with some embodiments.

The densification engine 304 can perform such operations for each of the delivery locations in the initial delivery route plan 400 and/or for each grocery delivery 404a to 4040j. An example densified delivery route plan 500 is shown in FIG. 5. As can be seen, the densified delivery route plan 500 includes supplemental deliveries 502a to 502n that have been added to the initial delivery route plan 400 to result in the densified delivery route plan 500. In this manner, more goods can be delivered during each delivery route than would otherwise be delivered using the initial delivery route plan 400 that only includes delivery of the grocery deliveries 404. Thus, the retailer can have reduced delivery costs since the excess capacity of the existing delivery fleet is better utilized.

Figure 6:
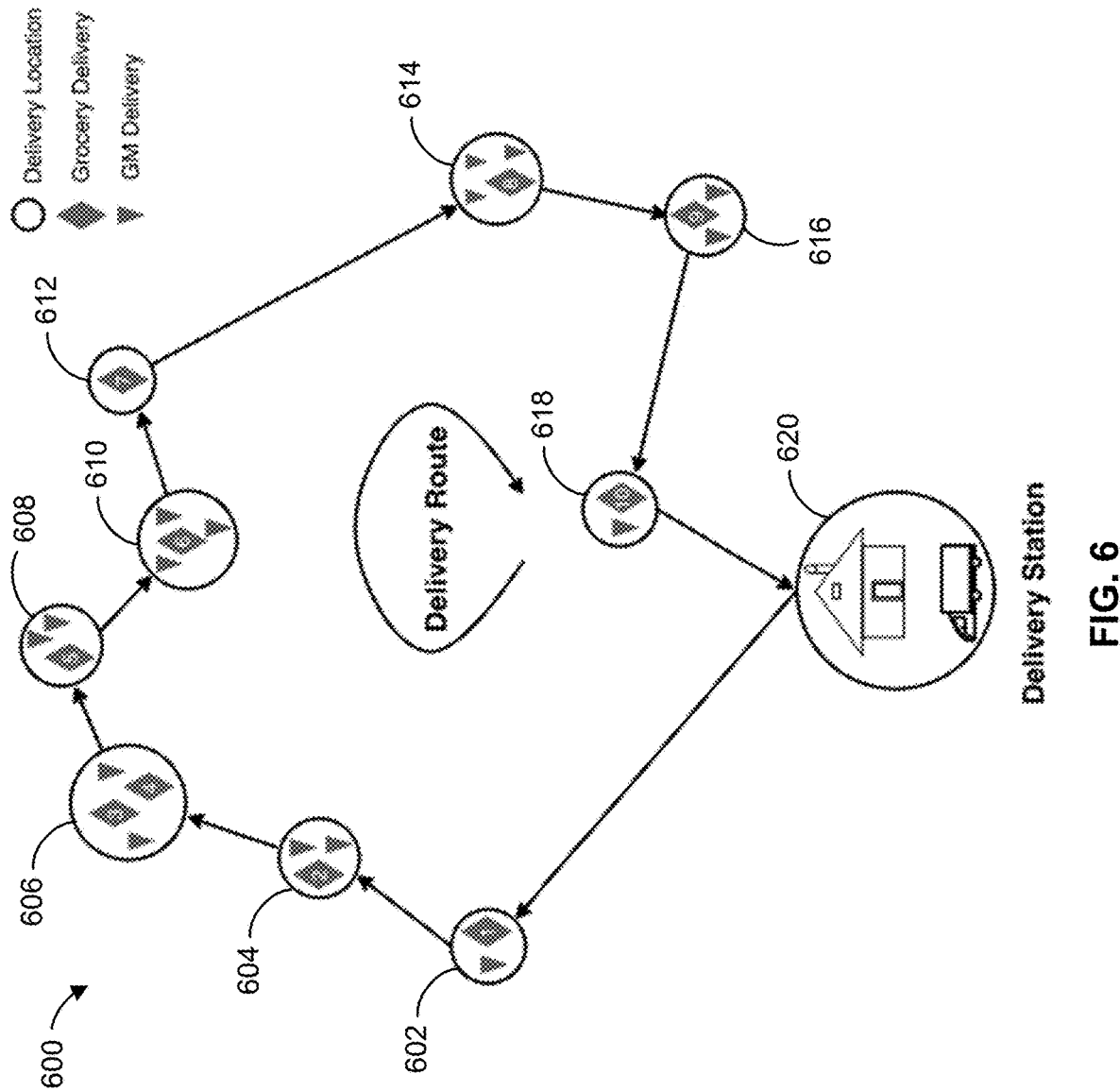
FIG. 6 is an illustration of an example delivery route and delivery plan that includes supplemental order deliveries in accordance with some embodiments.

Turning now to FIG. 6, an example delivery route 600 is shown. In this example, the delivery route 600 is a densified delivery route in that it includes not only grocery deliveries but also supplemental deliveries at each delivery location. In the first delivery location 602, the delivery route plan includes a delivery of one grocery delivery and one supplemental delivery. This corresponds to the grocery delivery 404a and the supplemental delivery 502a shown in FIG. 5. The delivery route 600 continues with delivery locations 604, 606, 608, 610, 612, 614, 616 and 618 before the delivery route 600 returns to the delivery station 620. The delivery station 620 can be the retailer's store, warehouse, distribution center, depot or the like.

As can be appreciated, the densified delivery route that can be executed pursuant to the densified delivery route plan 500 of the present disclosure can provide many advantages over existing grocery delivery methods. The densified delivery planning of the present disclosure can decrease the cost per delivery for the retailer, can increase the number of deliveries per route and increase the number of deliveries per stop. All these improvements can lead to lower costs and increased profits for the retailer as well as leading to increased revenues and increased customer satisfaction.

The densification engine 304 can densify the initial delivery route plan 400 using any suitable methodology. In one example, the densification engine 304 can use one or more delivery constraints to identify supplemental order deliveries 502 that can be added to an initial delivery route plan 400. The delivery constraints can include boundary conditions for one or more aspects of the initial delivery route plan 400. In one example, the delivery constraint can be a predetermined distance from the grocery delivery location. In such an example, the densification engine 304 can identify suitable supplemental order deliveries by finding deliveries that are less than a predetermined distance from the grocery delivery location. In another example, the delivery constraint can be an amount of time to travel to the delivery location of the supplemental order. In another example, the delivery constraint can require that a supplemental order delivery be located on a predetermined route within the initial delivery route plan 400. In still another example, the delivery constraint can require a supplemental order be fulfilled and/or dispatched from a common retail store. In still other examples, other delivery constraints can be used.

The densification engine 304 can apply these constraints using any suitable methodology such as spatial indexing or nearest-neighbor searching. The densification engine 304 can use the delivery locations 602, 604, 608, 610 as anchor points and apply the delivery constraints (as described above) to identify supplemental orders.

In another example, the densification engine 304 can include a supervised machine learning model that proactively predicts a density of the initial delivery route plan 400. This type of proactive route densification is a significant improvement over existing delivery systems because it can be difficult to manage grocery deliveries because grocery delivery route plans are often not finalized until a time near to (often less than 24 hours, sometime less than 8 hours) the delivery window selected by the customer. Because the grocery deliveries can be modified by the grocery customer, it can be difficult to densify and improve the efficiency of grocery deliveries. The densification engine 304, however, can predict a density of the initial delivery route plan 400.

The densification engine 304 can include a supervised machine learning model that can be trained with historical grocery order deliveries to predict future grocery deliveries. An ensemble of algorithms and machine learning models including autoregressive models such as ARIMA, random forest, gradient boosting and recurrent neural networks can be used to predict the number of grocery orders that will be delivered in a certain area of geography. Using the estimate from the algorithms and/or models as guidance, the densification engine 304 can proactively identify the general merchandise or other supplemental orders that can be chosen from a pool of supplemental or general merchandise orders that can be added to the delivery route plan. The densification engine 304 can then predict the likely initial delivery route plan 400 and identify recyclable time. The densification engine 304 can also identify supplemental order deliveries that can be inserted into the predicted initial delivery route plan 400. Once the grocery orders are finalized and/or the time allowed for modification of the grocery orders is closed, the delivery route planner 302 can determine the initial delivery route plan 400. The densification engine 304 can then determine any changes between the predicted initial delivery route plan and the initial delivery route plan and add the appropriate supplemental orders to the delivery route.

Figure 7:
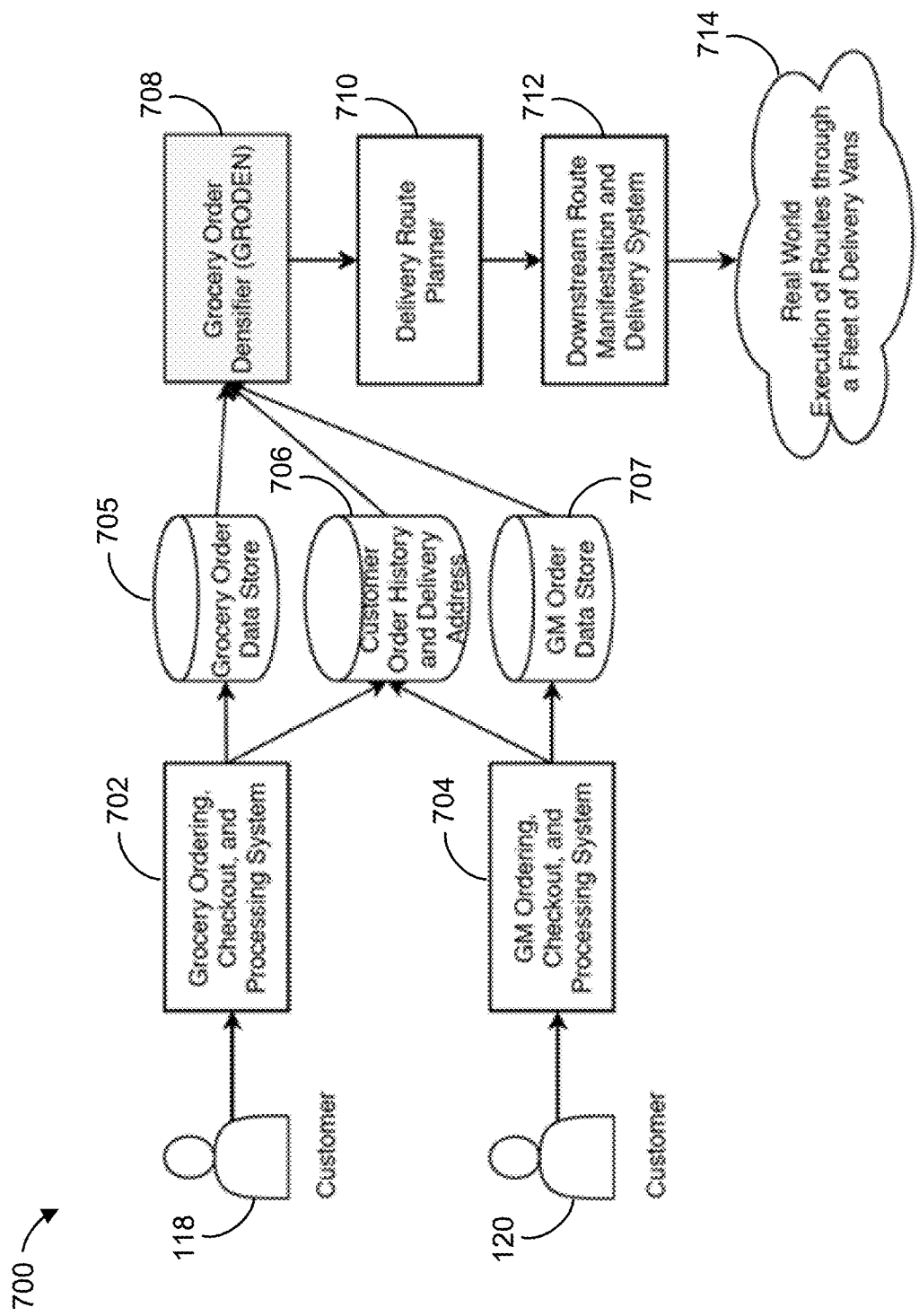
FIG. 7 is a block diagram illustrating an example process of adding supplemental order deliveries to a delivery plan in accordance with some embodiments.

Referring now to FIG. 7, an example method of delivering general merchandise orders with grocery orders is shown as performed by an example delivery system 700. As shown, a grocery customer 118 can interact with a grocery ordering, checkout and processing system 702. The grocery customer 118 can, for example, enter grocery items for purchase, identify a delivery location and select a delivery time window for the delivery of the grocery items. A general merchandise customer 120 can interact with a general merchandise ordering, checkout and processing system 704. The general merchandise customer 120 can, for example, enter general merchandise items for purchase, identify a delivery location and select a delivery time window for delivery of the general merchandise items. The grocery customer 118 and the general merchandise customer 120 can interact with the systems 702, 704 using a customer computing device such as a mobile phone, laptop, tablet, personal computer or the like. While system 702 and system 704 are shown as separate in FIG. 7, the systems can be a common system such as central ordering computing device 124 (FIG. 1).

In traditional system, these two types of merchandise (i.e., grocery and general merchandise) are typically delivered using two separate delivery systems. The grocery items are often delivered by a dedicated grocery delivery fleet because the grocery items often need particular transport environments for perishable goods and for refrigerated or frozen goods. In addition, the time windows for grocery items are often provided as small time windows of a few hours. In contrast, general merchandise is typically delivered using courier services, postal services or delivery fleets without specialized transport requirements. In addition, the time windows for general merchandise is often characterized in terms of day (e.g., next day delivery, 2 day delivery, 3 day delivery, etc.). For these reasons, traditional delivery systems often keep grocery deliveries and general merchandise delivers separate.

As previously described, the densified delivery routes of the present disclosure can include both grocery deliveries and general merchandise deliveries to improve the operating efficiencies of retailer's grocery delivery fleets. As shown, the information collected by the system 702 and the system 704 from the grocery customer 118 and the general merchandise customer 120, respectively can be sent to the grocery order data store 705, the customer order history and delivery address store 706 and the general merchandise order data store 707. The grocery order data store 705 can store order delivery data for grocery items. The customer order history and delivery address store 706 can store order delivery data that includes historical order history information and delivery address information for the grocery customer 118 and/or the general merchandise customer 120. The general merchandise order data store 707 can store order delivery data for general merchandise items.

The grocery order densifier (GRODEN) 708 can obtain data and information from the grocery order data store 705, the customer order history and delivery address store 706 and the general merchandise order data store 707. The GRODEN 708 can, for example, be similar to the densifier 102 and the densification engine 304 previously described. The GRODEN 708 can identify recyclable time and select general merchandise orders to be mixed with grocery orders for route planning. The GRODEN 708 can interact with the delivery route planner 710. The delivery route planner 710 can be similar to the delivery route planner 302, previously described. The delivery routes created by the delivery route planner 710 can be sent to the downstream route manifestation and delivery system 712. This can include the retailer store, distribution center or other location of the delivery fleet 122. The delivery system 712 can then cause the mixed grocery and general merchandise to be delivered as shown in real world execution of routes through a fleet of delivery vans 714.

Figure 8:
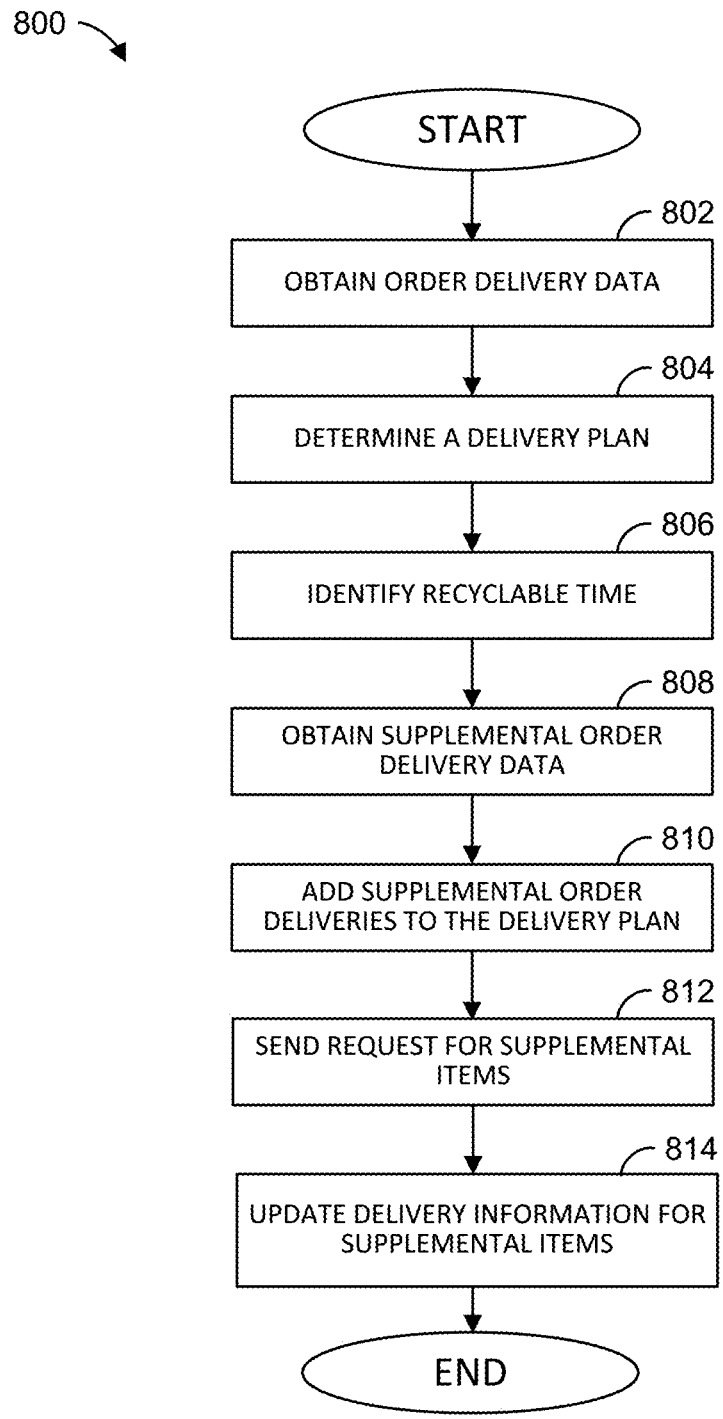
FIG. 8 is a flowchart of an example method of adding supplemental order deliveries to a delivery plan in accordance with some embodiments.

Turning now to FIG. 8, a method 800 of densifying a delivery route is shown. The method 800 is explained below in the context of the delivery route planning system 300 shown in FIG. 3. It should be appreciated, however, that the method 800 can be performed by other delivery system embodiments and/or by other computing devices.

At step 802, the densifier 102 can obtain order delivery data. The order delivery data can be information that characterizes delivery locations and delivery time windows associated with customer orders. In one example, the customer orders are grocery orders. The densifier 102 can obtain the order delivery data using any suitable methodology such as accessing the order delivery data that may be stored in database 108 and/or in central ordering computing device 124 using suitable Application Protocol Interfaces (APIs) or the like.

At step 804, the delivery route planner 302 of the densifier 102 can determine a delivery plan based on the order delivery data obtained at step 802. The delivery plan, for example, can be the initial delivery route plan 400. The delivery route planner 302 can use any suitable methodology, model or algorithm (as previously described) to determine the delivery route plan 400. In other examples, the densifier 102 can predict a delivery route plan based on the order delivery data. The densifier 102 may take advantage of the fact that grocery deliveries are often initiated well in advance of the delivery time window and thus predictor models can predict with accuracy the final grocery order such that the delivery plan can be predicted in advance of the delivery time window.

At step 806, the densifier 102 can identify recyclable time in the delivery plan that was determined at step 804. The densifier 102 can identify the recyclable time using any suitable methodology. The densifier 102 can, for example, compare an estimated delivery time with the allocated delivery time in the delivery plan. If the estimated delivery time is less than a predetermined threshold amount of time, the densifier 102 can designate such excess time as recyclable time. For example, if the delivery plan determined at step 804 includes a period of time of 20 minutes for the delivery of the first order in the delivery plan, the densifier 102 can compare this time to the estimated time to perform the delivery. The estimated time for delivery can be determined using one or more factors that characterize the delivery such as the number of totes, the weight of the totes and the type of delivery location (i.e., single family home, apartment complex, urban environment, suburban environment, etc.). In the example above, if the estimated time for the delivery is 5 minutes, then the densifier 102 can compare the allocated 20 minute period with the estimated 5 minute delivery time to identify 15 minutes of recyclable time. In other examples, the densifier 102 can use other machine learning models or algorithms to identify and/or estimate and/or proactively predict recyclable time from historical data or other data.

At step 808, the densifier 102 can obtain supplemental order delivery data. The densifier 102 can obtain the supplemental order delivery data using the same methods described above with respect to the order delivery data at step 802. The supplemental order delivery data can include information that characterizes supplemental orders, their delivery location and delivery time windows for other customer orders. In one example, the supplemental order delivery data includes information characterizing general merchandise items. The supplemental order delivery data can also include information that describes where the items in the supplemental order are located. In the context of general merchandise, the general merchandise may not be located in the same location as a grocery item. Grocery orders are often picked by workers at a grocery retail store. General merchandise is often delivered from a distribution center, warehouse or other location that may be remote from the grocery retail location. The densifier 102 can obtain supplemental order delivery data that includes the location of the general merchandise items so that if such items are added to a grocery delivery route, the general merchandise items can be sent to the grocery retail store. Still further, in some retail stores, both grocery and general merchandise items are sold in a single retail location. The supplemental order delivery data can identify if the general merchandise is located at the retail location of the grocery order.

At step 810, the densifier 102 can add supplemental order deliveries to the delivery plan. The densifier 102 can add supplemental order deliveries based on the supplemental order delivery data and the recyclable time that may have been identified. In addition, the densifier 102 may determine which supplemental orders to add based on one or more delivery constraints previously described.

At step 812, the densifier 102 can send a request for the supplemental items. As previously explained, the supplemental items that may be included in a supplemental order delivery that is added to the delivery may not be located at the grocery retail store from which the delivery route will be executed. In such a situation, the densifier 102 can send a request to a distribution center, warehouse or other location to request that the general merchandise be sent to the grocery retail store. After such general merchandise item arrives, it can then be included with the grocery items when the ordered items are loaded into the delivery vehicle.

At step 814, the densifier 102 can update delivery information for the supplemental items that may have been added to the delivery plan. The densifier 102 can, for example, send updated information to the central ordering computing device 124 that the supplemental item (e.g., a general merchandise item) is being delivered via the grocery delivery plan. In this manner, the central ordering computing device 124 can communicate such updated delivery information to the customer so that the customer will be aware of when the delivery of the general merchandise item will be completed.

While not shown in FIG. 8, the densifier can also send the densified delivery plan (i.e., the delivery plan including supplemental delivery orders) to the retailer order management system 112 so that the densified delivery plan can be executed by the retailer's delivery fleet 122. The densifier can also perform performance analysis and determine performance metrics regarding the efficiency and other performance measures of the retailer's delivery fleet.

The methods and systems of the present disclosure describe improvements to existing delivery systems. The delivery systems of the present disclosure operate to densify planned delivery routes to reduce the amount of under-utilized time during delivery routes. In addition to the addition of supplement orders or supplemental goods to delivery route plan, the principles, methods and apparatuses of the present disclosure can also be used to add services such as repair services, installation services, maintenance services or the like during a delivery route.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The term model as used in the present disclosure includes data models created using machine learning. Machine learning may involve training a model in a supervised or unsupervised setting. Machine learning can include models that may be trained to learn relationships between various groups of data. Machine learned models may be based on a set of algorithms that are designed to model abstractions in data by using a number of processing layers. The processing layers may be made up of non-linear transformations. The models may include, for example, artificial intelligence-based neural networks, deep convolutional and recurrent neural networks. Such neural networks may be made of up of levels of trainable filters, transformations, projections, hashing, pooling and regularization. The models may be used in large-scale sophisticated relationship-recognition tasks. The models can be created by using various open-source and proprietary machine learning tools known to those of ordinary skill in the art.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:

1. A system comprising:
a processor; and
a non-transitory memory storing instructions, that when executed, cause the processor to:
obtain, from an order computing device, order delivery data that includes information characterizing first delivery locations and first delivery time windows associated with a first plurality of orders from at least one first customer;
determine, based on the order delivery data, a delivery plan originating from a store and continuing through the first delivery locations associated with the first plurality of orders;
identify recyclable time in the delivery plan;
predict a density of the delivery plan using a trained machine learning model;
obtain supplemental order delivery data that includes information characterizing supplemental orders characterizing second delivery locations and second delivery time windows associated with a second plurality of orders from at least one second customer;
determine, based on the supplemental order delivery data, a second delivery plan originating from a store and continuing through the second delivery locations associated with the second plurality of orders;
add one or more supplemental order deliveries from the second plurality of orders to the delivery plan based on the recyclable time and the predicted density of the delivery plan, the supplemental order delivery data and at least one predetermined delivery constraint, to generate a first updated delivery plan;
determine whether supplemental items associated with the one or more supplemental order deliveries are available at the store from which the delivery plan originates;
send a request for the supplemental items to a distribution center when the supplemental items are unavailable at the store from which the delivery plan originates;
generate a second updated delivery plan based on the second delivery plan and the first updated delivery plan;
allocate the first updated delivery plan and the second updated delivery plan to a fleet of delivery vehicles, such that resources required to deliver ordered items according to the first updated delivery plan and the second updated delivery plan are minimized compared to resources required to deliver ordered items according to the delivery plan and the second delivery plan;

transmit the first updated delivery plan to a first delivery computing device to deliver ordered items to customers using one or more allocated vehicles according to the first updated delivery plan;

transmit the second updated delivery plan to a second delivery computing device to deliver ordered items to customers using one or more allocated vehicles according to the second updated delivery plan;

generate an update signal indicating that the supplemental items are being delivered via the first updated delivery plan; and send the update signal to the order computing device, the update signal instructing the order computing device to communicate updated supplemental order delivery data related to the supplemental items with one or more customers of the supplemental items.

2. The system of claim 1, wherein the instructions, when executed, further cause the processor to obtain historical order information for a customer associated with at least one of the first plurality of orders and to predict the density of delivery plan based on the historical order information.

3. The system of claim 1, wherein the first plurality of orders each comprise a grocery order for grocery items and the second plurality of orders each comprise an order for general merchandise items.

4. The system of claim 1, wherein the at least one predetermined delivery constraint includes a predetermined distance from the first delivery locations to the second delivery locations.

5. A method comprising:
obtaining, from an order computing device, order delivery data that includes information characterizing first delivery locations and first delivery time windows associated with a first plurality of orders from at least one first customer;
determining, based on the order delivery data, a delivery plan originating from a store and continuing through the first delivery locations associated with the first plurality of orders;
identifying recyclable time in the delivery plan;
predicting a density of the delivery plan using a trained machine learning model;
obtaining supplemental order delivery data that includes information characterizing supplemental orders characterizing second delivery locations and second delivery time windows associated with a second plurality of orders from at least one second customer;
determining, based on the supplemental order delivery data, a second delivery plan originating from a store and continuing through the second delivery locations associated with the second plurality of orders;
adding one or more supplemental order deliveries from the second plurality of orders to the delivery plan based on the recyclable time and the predicted density of the delivery plan, the supplemental order delivery data and at least one predetermined delivery constraint, to generate a first updated delivery plan;
determining whether supplemental items associated with the one or more supplemental order deliveries are available at the store from which the delivery plan originates;

sending a request for the supplemental items to a distribution center when the supplemental items are unavailable at the store from which the delivery plan originates;

generating a second updated delivery plan based on the second delivery plan and the first updated delivery plan;

allocating the first updated delivery plan and the second updated delivery plan to a fleet of delivery vehicles, such that resources required to deliver ordered items according to the first updated delivery plan and the second updated delivery plan are minimized compared to resources required to deliver ordered items according to the delivery plan and the second delivery plan;

transmitting the first updated delivery plan to a first delivery computing device to deliver ordered items to customers using one or more allocated vehicles according to the first updated delivery plan;

transmitting the second updated delivery plan to a second delivery computing device to deliver ordered items to customers using one or more allocated vehicles according to the second updated delivery plan;

generating an update signal indicating that the supplemental items are being delivered via the first updated delivery plan; and sending the update signal to the order computing device, the update signal instructing the order computing device to communicate updated supplemental order delivery data related to the supplemental items with one or more customers of the supplemental items.

6. The method of claim 5, further comprising obtaining historical order information for a customer associated with at least one of the first plurality of orders and predicting the density of delivery plan based on the historical order information.

7. The method of claim 5, wherein the first plurality of orders each comprise a grocery order for grocery items and the second plurality of orders each comprise an order for general merchandise items.

8. The method of claim 5, wherein the at least one predetermined delivery constraint includes a predetermined distance from the first delivery locations to the second delivery locations.

9. A non-transitory computer readable medium having instructions stored thereon, wherein the instructions, when executed by at least one processor, cause a device to perform operations comprising:
obtaining, from an order computing device, order delivery data that includes information characterizing first delivery locations and first delivery time windows associated with a first plurality of orders from at least one first customer;
determining, based on the order delivery data, a delivery plan originating from a store and continuing through the first delivery locations associated with the first plurality of orders;
identifying recyclable time in the delivery plan;
predicting a density of the delivery plan using a trained machine learning model;
obtaining supplemental order delivery data that includes information characterizing supplemental orders characterizing second delivery locations and second delivery time windows associated with a second plurality of orders from at least one second customer;
determining, based on the supplemental order delivery data, a second delivery plan originating from a store and continuing through the second delivery locations associated with the second plurality of orders;

adding one or more supplemental order deliveries from the second plurality of orders to the delivery plan based on the recyclable time and the predicted density of the delivery plan, the supplemental order delivery data and at least one predetermined delivery constraint, to generate a first updated delivery plan;

determining whether supplemental items associated with the one or more supplemental order deliveries are available at the store from which the delivery plan originates;

sending a request for the supplemental items to a distribution center when the supplemental items are unavailable at the store from which the delivery plan originates;

generating a second updated delivery plan based on the second delivery plan and the first updated delivery plan;

allocating the first updated delivery plan and the second updated delivery plan to a fleet of delivery vehicles, such that resources required to deliver ordered items according to the first updated delivery plan and the second updated delivery plan are minimized compared to resources required to deliver ordered items according to the delivery plan and the second delivery plan;

transmitting the first updated delivery plan to a first delivery computing device to deliver ordered items to customers using one or more allocated vehicles according to the first updated delivery plan;

transmitting the second updated delivery plan to a second delivery computing device to deliver ordered items to customers using one or more allocated vehicles according to the second updated delivery plan;

generating an update signal indicating that the supplemental items are being delivered via the first updated delivery plan; and sending the update signal to the order computing device, the update signal instructing the order computing device to communicate updated supplemental order delivery data related to the supplemental items with one or more customers of the supplemental items.

10. The non-transitory computer readable medium of claim 9, wherein the operations further comprise obtaining historical order information for a customer associated with at least one of the first plurality of orders and predicting the density of delivery plan based on the historical order information.

11. The non-transitory computer readable medium of claim 9, wherein the at least one predetermined delivery constraint includes a predetermined distance from the first delivery locations to the second delivery locations.

* * * * *